United States Patent [19]

Groff et al.

[11] 4,288,463
[45] Sep. 8, 1981

[54] METHOD OF MAKING PRETZELS OF SELECTED SPIRAL PITCH

[76] Inventors: Edwin I. Groff; Edwin T. Groff, both of 120 S. 3rd Ave., West Reading, Pa. 19611

[21] Appl. No.: 122,374

[22] Filed: Feb. 19, 1980

Related U.S. Application Data

[60] Continuation of Ser. No. 6,359, Jan. 25, 1979, abandoned, which is a division of Ser. No. 913,582, Jun. 8, 1978, abandoned.

[51] Int. Cl.³ .............................................. D21C 11/16
[52] U.S. Cl. .................................. 426/500; 264/103; 264/295; 426/516
[58] Field of Search .............. 426/499, 500, 502, 514, 426/516, 517, 518, 505, 501; 264/103, 295, DIG. 81, 75; 425/319, 320, 323

[56] References Cited

U.S. PATENT DOCUMENTS

| | | | |
|---|---|---|---|
| 2,174,779 | 10/1939 | Delorme | 264/75 |
| 2,248,291 | 7/1941 | Walborn | 426/502 |
| 2,357,085 | 8/1944 | Cohen et al. | 426/502 |
| 2,463,112 | 3/1949 | Kipinis | 426/500 |
| 2,566,846 | 9/1951 | Martin | 425/319 |
| 2,888,888 | 6/1959 | Jorgenson et al. | 426/501 |
| 3,876,743 | 4/1975 | Soderland et al. | 426/500 |

*Primary Examiner*—S. Leon Bashore
*Assistant Examiner*—Steve Alvo
*Attorney, Agent, or Firm*—Robert K. Youtie

[57] ABSTRACT

A pretzel making method wherein dough is extruded and the extrusion is rotated about an eccentric axis into a spiral configuration for baking.

The extruded dough is gravitationally passed to a conveyor belt. The vertical distance that the dough downwardly passes through is varied to change the wound spiral to a selected pitch.

2 Claims, 4 Drawing Figures

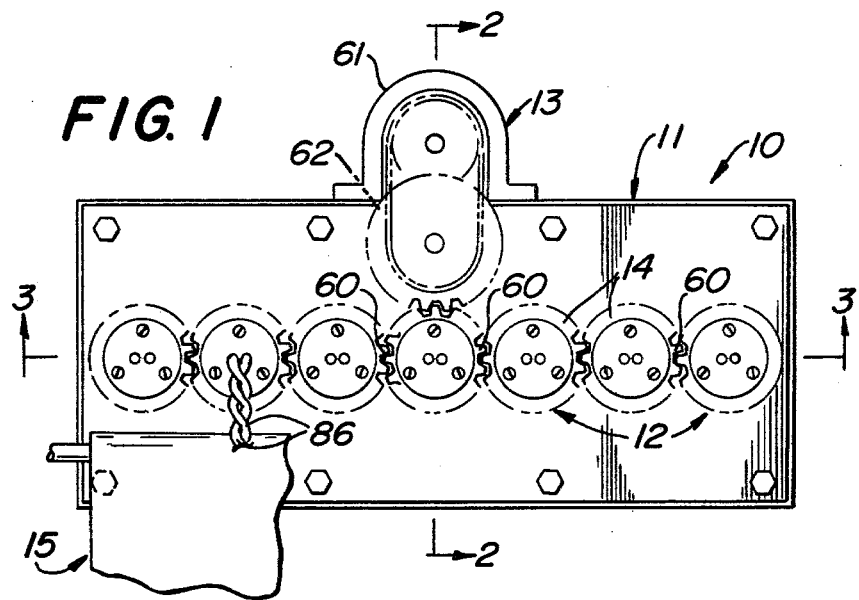
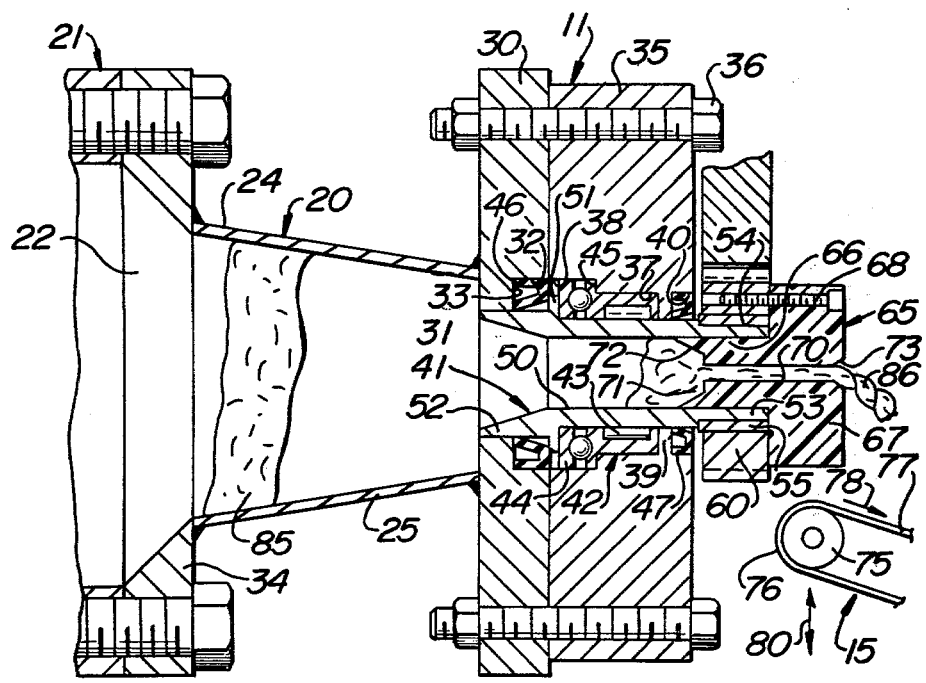

METHOD OF MAKING PRETZELS OF SELECTED SPIRAL PITCH

CROSS REFERENCE TO RELATED APPLICATIONS

This application is a continuation of application Ser. No. 6,359 filed Jan. 25, 1979, which is a divisional application of patent application Ser. No. 913,582 filed June 8, 1978, both now abandoned.

BACKGROUND OF THE INVENTION

The prior art shows some concern with spirally configured food products formed by extrusion. However, the prior art methods are relatively expensive, both in initial and operating costs, and are incapable of producing pretzels.

SUMMARY OF THE INVENTION

It is, therefore, an important object of the present invention to provide an extremely simple method for the manufacture of a spirally configured pretzel, which method is inexpensive in practice, and capable of substantial variation in use to produce pretzels of widely varying spiral configurations.

It is another object of the present invention to provide a method for manufacture of spiral pretzels, which results in rapid production, while affording a range of production speed as required to achieve desired product configuration.

Other objects of the present invention will become apparent upon reading the following specification and referring to the accompanying drawings, which form a material part of this disclosure.

The invention accordingly consists in the combinations and arrangements of method steps, which will be exemplified in the following description, and of which the scope will be indicated by the appended claims.

BRIEF DESCRIPTION OF THE DRAWINGS

FIG. 1 is a front elevational view showing apparatus of the present method looking toward the extrusion discharge, with a conveyor partly broken away.

FIG. 2 is a sectional elevational view taken generally along the line 2—2 of FIG. 1, enlarged for clarity of detail.

DESCRIPTION OF THE PREFERRED EMBODIMENT

Figure 3:
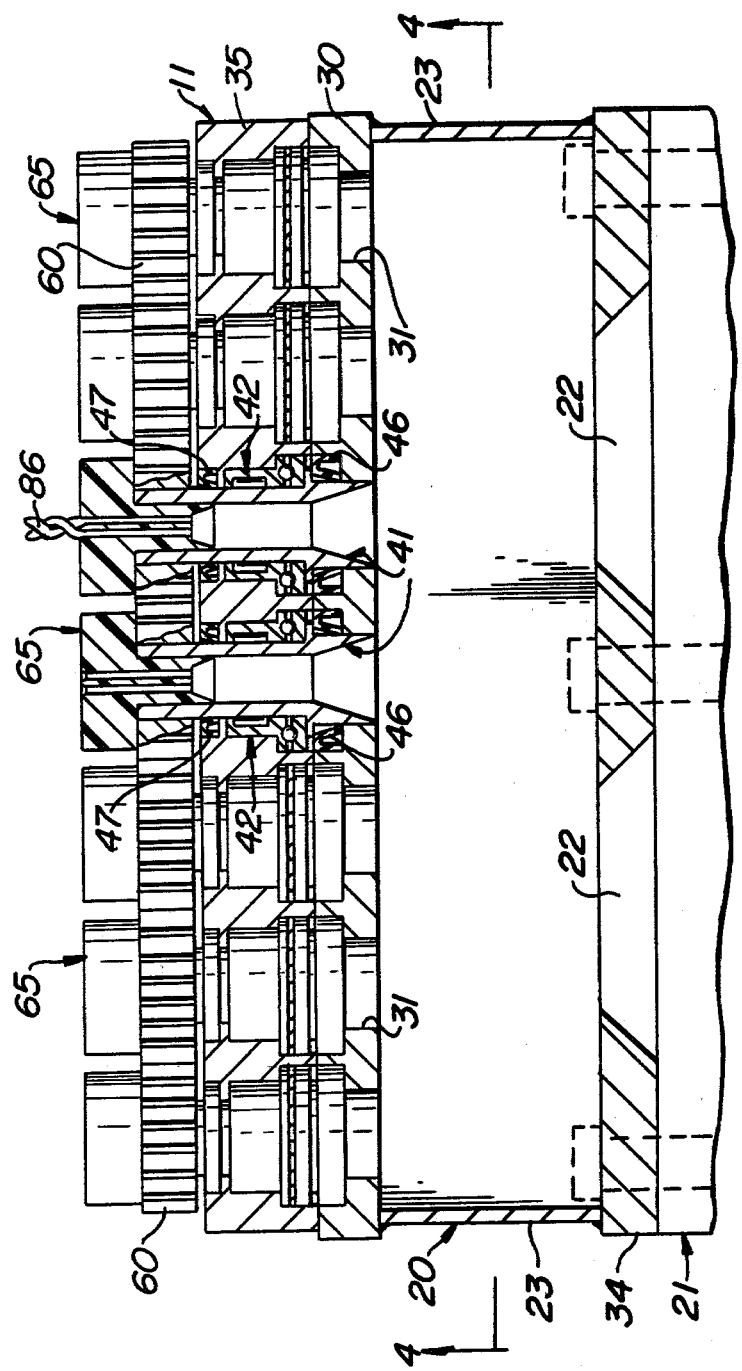
FIG. 3 is a horizontal sectional view taken generally along the line 3—3 of FIG. 1, partly broken away to facilitate understanding.

Referring now more particularly to the drawings, and specifically to FIG. 1 thereof, the apparatus of the present method is there generally designated 10, and may include an extrusion head 11 having mounted on the outlet end thereof a plurality of rotary extrusion dies 12. The dies 12 may be arranged in a generally horizontal row across the head 11 and may be rotated by suitable motive means 13 and interconnecting drive means, such as gearing 14. Downstream from the extrusion head 11, below the extrusion dies 12, there may be provided a conveyor 15 for conveying away the extrusion product or extrudate.

Figure 4:
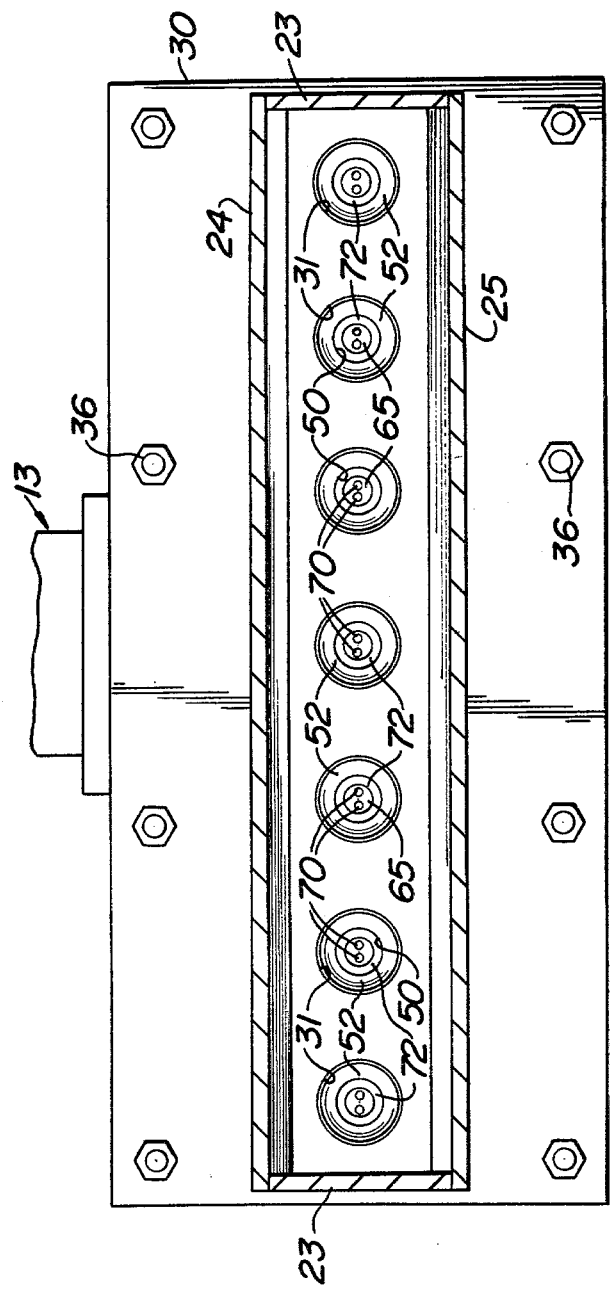
FIG. 4 is a transverse sectional elevational view showing the inlet side of the extrusion means.

Considering now the apparatus in greater detail, with specific reference to FIGS. 2-4, the extruder head 11 may be mounted at one end of a pressurizing or pressure equalization chamber 20, which latter is mounted to suitable conventional fluid pressurizing or pumping means 21, such as that of a screw type extruder. The pressurizing means may be of multiple screw type, say having a pair of discharge openings 22, see FIG. 3 communicating from upstream with compression or pressure equalization chamber 20. The compression or pressure equalization chamber 20 may be constituted of a pair of laterally spaced, generally vertically disposed side walls 23 extending from opposite sides of the discharge plate 34 of pressurizing pump 21. In addition, upper and lower compression chamber walls 24 and 25 extend downstream from the discharge plate 34, laterally between the side walls 23. More specifically, the upper compression chamber wall 24 extends laterally between the upper edges of side walls 23, while the lower compression chamber wall 25 extends laterally between the lower edges of the side walls 23. Further, the upperaand lower compression chamber walls 24 and 25 preferably converge in the downstream direction, as best seen in FIG. 2.

The extrusion head 11 may include a generally vertically disposed, laterally extending mounting plate 30 extending across the forward or downstream end of the compression chamber 20. The compression chamber 20 may have its side walls 23, and top and bottom walls 24 and 25 suitably secured to each other, as by welding, and also suitably secured at their upstream and downstream ends to the discharge plate 34 and mounting plate 30, also by welding, if desired.

The mounting plate 30 is provided with a generally horizontally arranged row or series of through apertures or holes 31 communicating upstream with the interior of compression chamber 20. The holes 31 may be generally circular, and of generally cylindrical internal configuration, if desired. Further, each hole 31 is formed on its downstream end with a generally circular recess or groove 32, concentric with the respective hole 31 and opening downstream through the forward or downstream face of the mounting plate 30. The annular or circular recesses 32 each defines in its respective holes 31 an annular or circular, downstream facing shoulder 33, see FIG. 2.

The extrusion head 11 further includes a carrier plate or body 35 disposed downstream of and in facing engagement with the downstream face of mounting plate 30. Further, the body 35 is detachably affixed to the mounting plate 30 by suitable means, such as fasteners or tie bolts 36.

The body 35 is provided with a plurality of through openings 37, each aligned with a respective through opening 31 of the mounting plate 30. Each through opening 37 may include, at its upstream end, an annular recess 38 of a diameter approximately equal to and opening directly into the recess 32 of the adjacent hole 31. Further, each through hole 37 may include, at a location adjacent to and spaced inward from its forward or downstream end, an internal annular rib or shoulder 39. The shoulder 39 is spaced inward from the downstream or front surface of the body 35, so as to leave a circular recess 40 at the downstream end of opening 37, and opening through the downstream or front surface of the body 35.

A tubular member or fluid conduit is generally designated 41, and located in each of the aligned through openings 31,37. Also, in each opening 37, there may be provided suitable bearing means 42, say anti-friction bearing means of combined radial and thrust bearing type. Specifically, each bearing means 42 may include a radial bearing part 43 mounted in hole or opening 37 of body 35 adjacent the upstream side of shoulder 39. In addition, each combination bearing 42 may include a radial thrust bearing part 44 located in the recess 38, and in bearing engagement with the upstream facing shoulder 45 of the latter recess. The thrust bearing part 44 does not fully occupy the annular recess 38. Thus, the annular recess 32 of the mounting plate 30 adjacent to the thrust bearing part 44 is adapted to receive an annular packing ring or seal 46, and similarly the downstream or forwardly opening recess 40 is adapted to receive an additional annular seal or packing ring 47.

Each tubular member or conduit 41 includes a generally cylindrical medial portion 50, being generally cylindrical both internally and externally, for reception in the through opening 37 of the body 35 and rotary journaled support therein by rotary bearing part 43. The intermediate cylindrical portion 50 extends upstream just beyond the thrust bearing part 44 where it is provided externally with an annular flange or shoulder 51 in thrust bearing engagement with the upstream side of thrust bearing part 44.

Extending upstream from the intermediate portion 50 of tubular conduit 41 is an inlet or upstream portion 52, which may be externally cylindrical for rotative reception in mounting plate opening 31, and may be internally flared to facilitate passage therethrough of dough.

Downstream from the medial tube portion 50, the tube extends outward beyond the body 35, there defining a downstream tube portion 53, which may internally constitute a continuation of the cylindrical interior of medial portion 50, and exteriorly may be reduced, as at 54, to receive a gear mounting bushing 55.

Considering now in greater detail, the seal 46, such may be constituted of a flexible, resilient annulus, say of rubber or the like, say having a generally "V"-shaped cross section with the apex of the "V" toward the shoulder or flange 51 and engagement therewith. Stated otherwise, the resiliently flexible annular seal 46, being of "V"-shaped cross-section with its opening facing upstream may bear against the upstream side of shoulder or flange 51. Further, the annular seal 46 may extend radially between the mounting plate 30, as the inner wall of recess 32, and radially inwardly to the outer cylindrical surface of upstream portion 52 of conduit 41. It will therefore be apparent that seal 46 effectively excludes the passage thereby of dough or other material to the bearing means 42. Moreover, any pressure on seal 46 from upstream distends the seal to more forcefully occlude the receiving recess 32 to the passage of material therethrough. As operating pressure is always exerted from the upstream region, it will be understood that there need be no concern for the passage of material from bearing means 42 upstream.

The downstream seal 47 may also be of an annular resiliently flexible construction, say of "V"-shaped cross-section, with its open side facing upstream to preclude the downstream passage therethrough of lubricant or other material. If desired, a retainer ring or other suitable retaining means may be employed to hold the downstream seal 47 in proper position within recess 40.

Circumposed about each bushing 55 may be a component of the transmission means 14, say constituting a spur gear 60. The several spur gears 60 are each suitably fixedly circumposed about its respective downstream conduit end portion 53, as by suitable fastener means, and may be arranged with adjacent spur gears in tangential meshing engagement with each other, as best seen in FIG. 1.

The motive means 13 may include an electric motor 61, or other suitable prime mover, say driving a drive gear 62, which is in meshing engagement with one of the several spur gears 60. Obviously, this will effect simultaneous rotation of all the spur gears 60. If desired, other suitable drive means may be employed, say by sprocket chain, or otherwise, if desired.

Conformably inserted in the downstream or outlet end portion 53 of each conduit 51 is an extrusion die element 65. That is, each extrusion die element 65 includes a generally cylindrical upstream or plug portion 66 snugly inserted into the downstream end portion 53 of its associated tubular conduit 41, and a downstream end enlargement or flange 67 extending radially outwardly beyond the downstream tube portion 53 and bushing 55 to overlie the associated spur gear 60. Each die element 65 may be removably fastened in position by any suitable means, such as threaded fasteners 68 extending upstream through end enlargement or flange 67 into threaded engagement in the adjacent spur gear 60.

At least one, and preferably a plurality of longitudinally extending through holes 70 are formed in each die element 65 opening upstream into the tubular conduit 41 for receiving dough and opening downstream for extruding the received dough. More specifically, the upstream ends of the bores or passageways 70 open into an upstream facing flaring recess 71, which receives dough under pressure and includes a circumferential wall 72 adapted to be radially outwardly distended by pressure to preclude the passage of dough between the tubular conduit 41 and die 65. Also, the downstream end of each extrusion passageway or bore 70 is flared, as at 73, to enhance the extrusion of a clean strand unimpaired by adhesion to the die. A die of low friction plastic material, such as Teflon has been found entirely satisfactory.

In the illustrated embodiment, there are shown a pair of diametrically opposed and equally eccentrically spaced extrusion holes 70, but it is appreciated that a single eccentric extrusion hole, or non-equally spaced holes of plural number may be employed, as desired.

In addition, located directly below and beneath the several extrusion units may be the conveyor 15, which may include a rotary, generally horizontally disposed, laterally extending upstream roller 75, and a web 76 trained over the roller 75, including a lower run 76 moving generally upstream, thence upwardly about roller 75, and an upper run 77 passing downstream, in the direction of arrow 78. In addition, the conveyor 15 may be adjustable in the direction of arrows 80, vertically toward and away from the extrusion heads or dies 65.

In practice of the instant method of pretzel manufacture and operation of the described machine, pretzel dough of desired formulation is fed by conventional extrusion pumps downstream, through openings 22 in plate 34. By the gradual convergence downstream in the compression chamber 20, the dough is pressurized, and upon movement toward the dough outlets in mounting plate 30, pressurization thereacross is substantially equalized. The pressurized dough passes thence into each of the several tubes or conduits 41, rotating therewith, and being extruded through the several extrusion bores 70 for simultaneous extrusion and eccentric rotation about the axis of the respective die 65. The strands of dough, as at 86, are thus simultaneously progressed or moved downstream, while being rotated about eccentric axes, to form helical or spirally configured dough strands. Moreover, with plural dough strands 86 being simultaneously spirally extruded from a single die 65, the strands intertwine, as seen in FIGS. 1 and 2.

The extruded dough then passes downwardly onto the upper run 77 of conveyor 15 for passage to an oven and subsequent baking. The vertical position of the upper conveyor run 77 is critical to the final configuration of extruded dough strands. With the conveyor 15 raised, the spirally extruded strands 86 progress to the upper conveyor run 77 with very little distortion, for conveyance to the oven in a configuration quite similar to that extruded. However, with the conveyor 15 lowered considerably away from the die element 65, the spirally extruded strands 86 are, by their own weight, gravitationally stretched to produce a spiral configuration of greater pitch with plural strands more closely sound. Of course, the extruded spiral pitch and rate of extrusion may be controlled, as desired, by varying the pressure of dough 85 in compression chamber 20, as by control of the extrusion pumps; and also, angular speed of the die 65 and linear speed of the belt may be suitably varied to achieve a desired spiral pitch.

From the foregoing, it is seen that the present invention provides a pretzel manufacturing method which is extremely simple, capable of rapid production of high quality pretzels, and which otherwise fully accomplish its intended objects.

Although the present invention has been described in some detail by way of illustration and example for purposes of clarity of understanding, it is understood that certain changes and modifications may be made within the spirit of the invention.

What is claimed is:

1. In the method of manufacturing pretzels, the steps which comprise: extruding pretzel dough to form at least one dough strand, rotating said dough strand during extrusion about an eccentric axis to spirally wind the dough strand, gravitationally passing the dough strand downwardly during said rotation through a vertical distance from the point of final extrusion onto a conveyor belt, varying said vertical distance to change the wound spiral to a selected spiral pitch, and conveying away on the conveyor belt the spirally wound dough strand of the selected pitch for baking.

2. The method according to claim 1, further characterized in extruding a plurality of dough strands and conveying away the spirally wound dough strands for baking.

* * * * *